US012454704B2

(12) United States Patent
Sama et al.

(10) Patent No.: US 12,454,704 B2
(45) Date of Patent: Oct. 28, 2025

(54) EFFICIENT GENE DELIVERY TOOL WITH A WIDE THERAPEUTIC MARGIN (71) Applicant: FREIE UNIVERSITÄT BERLIN, Berlin (DE)

(72) Inventors: Simko Sama, Berlin (DE); Alexander Weng, Berlin (DE); Hardy Mitdank, Berlin (DE)

(73) Assignee: FREIE UNIVERSITÄT BERLIN, Berlin (DE)

(*) Notice: Subject to any disclaimer, the term of this patent is extended or adjusted under 35 U.S.C. 154(b) by 714 days.

(21) Appl. No.: 17/787,296

(22) PCT Filed: Dec. 17, 2020

(86) PCT No.: PCT/EP2020/086781
§ 371 (c)(1),
(2) Date: Jun. 18, 2022

(87) PCT Pub. No.: WO2021/122998
PCT Pub. Date: Jun. 24, 2021

(65) Prior Publication Data
US 2023/0039644 A1 Feb. 9, 2023

(30) Foreign Application Priority Data
Dec. 18, 2019 (EP) .................... 19217512

(51) Int. Cl.
C12N 15/87 (2006.01)
A61K 47/26 (2006.01)
C07H 15/256 (2006.01)

(52) U.S. Cl.
CPC ........... C12N 15/87 (2013.01); A61K 47/26 (2013.01); C07H 15/256 (2013.01)

(58) Field of Classification Search
CPC ............................ A61K 47/26; C12N 15/87
See application file for complete search history.

(56) References Cited

FOREIGN PATENT DOCUMENTS

WO 2019011914 A1 1/2019
WO 2020/126620 A2 6/2020

OTHER PUBLICATIONS

Tschesche R., et al., "Uber das Hauptsaponin der Kornrade (*Agrostemma githago* L.)," Chemische Berichte, vol. 107, Issue 8, pp. 2710-2719 (Aug. 1974).
Siepmann C., et al., "New saponins from the seeds of *Agrostemma githago* var. *githago*," Planta medica, vol. 64, Issue 2, pp. 159-164 (Mar. 1998).
Hebestreit P., et al., "Cytotoxic activity of the seeds from *Agrostemma githago* var. *githago*," Planta Medica, vol. 69, Issue 10, pp. 921-925 (Oct. 2003).
Bottger S., et al., "More triterpenoid bisdesmosidic saponins from *Agrostemma githago* L. (corn cockle)," Planta Med. vol. 79, (2013).
IL Office Action dated Jul. 19, 2023 as received in Application No. 293923.
JP Office Action dated Feb. 12, 2025 as received in Application No. 2022-537736.
Clochard, J. et al. "A new acetylated triterpene saponin from *Agrostemma githago* L. modulates gene delivery efficiently and shows a high cellular tolerance." Int. J. of Pharmaceutics 589 (2020) 119822.
Fabbrini, M. S. et al., "Characterization of a saporin isoform with lower ribosome-inhibiting activity", The Biochemical Journal, 322 ( Pt 3) (1997) 719-727.
Fu, H. et al. "Silenorubicosides A-D, Triterpenoid Saponins from *Silene rubicunda*." Journal of Natural Products 68 (5) (2005): 754-758.
Fuchs, H. et al. "Glycosylated Triterpenoids as Endosomal Escape Enhancers in Targeted Tumor Therapies." Biomedicines 5 (2) (2017): 14.
Haddad, M. et al. "New triterpene saponins from *Acanthophyllum pachystegium*." Helvetica chimica acta 87 (1) (2004): 73-81.
Jia, Z. et al. "Major triterpenoid saponins from *Saponaria officinalis*." Journal of natural products 61 (11) (1998): 1368-1373.
Kay, M. A., et al., "A robust system for production of minicircle DNA vectors", Nature Biotechnology, 28 (2010) 1287-1289.
Kokorin, A. et al., "A new type 1 ribosome-inactivating protein from the seeds of *Gypsophila elegans* M.Bieb", Phytochemistry, 157 (2019) 121-127.
Luke, J. M. et al., "Improved antibiotic-free plasmid vector design by incorporation of transient expression enhancers", Gene Therapy, 18 (2011) 334-343.
Moniuszko-Szajwaj, B. et al. "Highly Polar Triterpenoid Saponins from the Roots of *Saponaria officinalis* L." Helvetica Chimica Acta 99 (5) (2016): 347-354.
Sama, S. et al. "Targeted suicide gene transfections reveal promising results in nu/nu mice with aggressive neuroblastoma", Journal of Controlled Release, 275 (2018): 208-216.
Sama, S. et al. "Plant derived triterpenes from *Gypsophila elegans* M.Bieb. enable non-5 toxic delivery of gene loaded hanoplexes", Journal of Biotechnology 284 (2018): 131-139.
Sama, S. et al. "Sapofectosid—Ensuring nontoxic and effective DNA and RNA delivery", International Journal of Pharmaceutics 534 (2017): 195-205.
Sama, S. et al. "Untersuchung von Saponinen als neuartige Verstärker der Transfektion." Dissertation, Freie Universitaet Berlin 2018. English summary (pp. 138-139).
Sama, S. et al. "Structure-Activity Relationship of Transfection-Modulating Saponins—A Pursuit for the Opticmal Gene Trafficker." Planta Medica 85 (2019): 513-518.
Thakur, M. et al. "High-speed countercurrent chromatographic recovery and off-line electrospray ionization mass spectrometry profiling of bisdesmodic saponins from *Saponaria officinalis* possessing synergistic toxicity enhancing properties on targeted antitumor toxins." Journal of Chromatography B 955 (2014): 1-9.
Weise, C., et al., "An unusual type I ribosome-inactivating protein from *Agrostemma githago* L", Scientific Reports, 10 (2020) 15377.

(Continued)

Primary Examiner — Paul V Ward
(74) Attorney, Agent, or Firm — Maschoff Brennan (57) ABSTRACT The disclosure relates to novel saponins comprising acetyl residues on two of their sugar residues. These saponins are able to enhance the transfection efficiency to a high extent and show much less cytotoxic side effects than already known saponins.

12 Claims, 7 Drawing Sheets (56) References Cited

OTHER PUBLICATIONS

Weng, A. et al. "Improved intracellular delivery of peptide- and lipidnanoplexes by natural glycosides." Journal of Controlled Release 206 (2015): 75-90.
Weng, A. et al. "Saponins modulate the intracellular trafficking of protein toxins." Journal of controlled release 164 (1) (2012): 74-86.
Weng, A. et al. "The toxin component of targeted anti-tumor toxins determines their efficacy increase by saponins." Molecular oncology 6 (3) (2012): 323-332.
Weng, A. et al. "A convenient method for saponin isolation in tumour therapy." Journal of Chromatography B 878 (7) (2010): 713-718.
Weng, A. et al. "A simple method for isolation of Gypsophila saponins for the combined application of targeted toxins and saponins in tumor therapy." Planta medica 75 (13) (2009): 1421-1422.

EFFICIENT GENE DELIVERY TOOL WITH A WIDE THERAPEUTIC MARGIN

CROSS-REFERENCE TO A RELATED APPLICATION

This application is a National Phase Patent Application of International Patent Application Number PCT/EP2020/086781, filed on Dec. 17, 2020, which claims priority of European Patent Application Number 19 217 512.3, filed on Dec. 18, 2019.

BACKGROUND

The disclosure relates to a saponin, to a transfection composition, to a method for an in-vitro transfection and to a method for isolating such a saponin.

In the last decades, gene therapy became more and more important. Gene therapy is applied in order to heal severe diseases being otherwise hard to treat. Genetic disorders such as Hemophilia A, cystic fibrosis or different kinds of cancer have been the target of newly developed gene therapies. Nowadays, there is a number of techniques to deliver genetic material into a mammalian cell. However, gene therapies have to fulfill certain conditions in order to be applied in clinic. Apparently, one of the most crucial requirements is an efficient gene transfer having preferably no toxic side effects. Many previously established gene therapies have failed in this regard.

Many saponins have been described in the past. Exemplarily, reference is made to Weng, Alexander, et al. "A simple method for isolation of Gypsophila saponins for the combined application of targeted toxins and saponins in tumor therapy." Planta medica 75 (13) (2009): 1421-1422; Weng, Alexander, et al. "A convenient method for saponin isolation in tumour therapy." Journal of Chromatography B 878 (7) (2010): 713-718; Weng, Alexander, et al. "The toxin component of targeted anti-tumor toxins determines their efficacy increase by saponins." Molecular oncology 6 (3) (2012): 323-332; and Weng, Alexander, et al. "Saponins modulate the intracellular trafficking of protein toxins." Journal of controlled release 164 (1) (2012): 74-86. It has also been described that a specific saponin (SO1861) can mediate an improved intracellular delivery of peptide and lipid nanoparticles (Weng, Alexander, et al. "Improved intracellular delivery of peptide- and lipid-nanoplexes by natural glycosides." Journal of Controlled Release 206 (2015): 75-90).

Certain triterpenoid saponins can also be denoted as plant-derived transfection enhancers, since they are able to increase the amount of genetic material delivered to a patient very efficiently, especially when being co-applied to gene-bearing nanoplexes. The saponin-based transfection enhancement was named sapofection. Particularly efficient saponins are 501861 (Sapofectosid) from Saponaria officinalis L. (Sama, Simko et al. "Sapofectosid—Ensuring non-toxic and effective DNA and RNA delivery", International Journal of Pharmaceutics 534 (2017): 195-205) and GE1741 (Gypsophilosid A) from Gypsophila elegans M. Bieb (Sama, Simko et al. "Plant derived triterpenes from Gypsophila elegans M.Bieb. enable non-toxic delivery of gene loaded nanoplexes", Journal of Biotechnology 284 (2018): 131-139).

GE1741 and its uses are also described in WO 2019/011914 A1.

In-vitro and in-vivo studies with saponin-mediated transfections showed a massive increase of delivered nucleic acids with no toxic effects. In a conducted mice study a significant decrease of tumor volume was observed, as the delivered DNA coding for the toxic ribosome-inactivating protein Saporin was complexed in targeted nanoplexes and (Sama, Simko et al. "Targeted suicide gene transfections reveal promising results in nu/nu mice with aggressive neuroblastoma", Journal of Controlled Release, 275 (2018): 208-216).

Further saponins are described in the following publications:

Thakur, Mayank, et al. "High-speed countercurrent chromatographic recovery and off-line electrospray ionization mass spectrometry profiling of bisdesmodic saponins from Saponaria officinalis possessing synergistic toxicity enhancing properties on targeted antitumor toxins." Journal of Chromatography B 955 (2014): 1-9;

Jia, Zhonghua, Kazuo Koike, and Tamotsu Nikaido. "Major triterpenoid saponins from Saponaria officinalis." Journal of natural products 61 (11) (1998): 1368-1373;

Haddad, Mohamed, et al. "New triterpene saponins from Acanthophyllum pachystegium." Helvetica chimica acta 87 (1) (2004): 73-81;

Fu, Hongzheng et al. "Silenorubicosides A-D, Triterpenoid Saponins from Silene rubicunda." Journal of Natural Products 68 (5) (2005): 754-758;

Moniuszko-Szajwaj, Barbara, et al. "Highly Polar Triterpenoid Saponins from the Roots of Saponaria officinalis L." Helvetica Chimica Acta 99 (5) (2016): 347-354;

Fuchs, Hendrik, et al. "Glycosylated Triterpenoids as Endosomal Escape Enhancers in Targeted Tumor Therapies." Biomedicines 5 (2) (2017): 14.

SUMMARY

It is an object underlying the proposed solution to provide a compound being able to deliver small compounds such as peptides and nucleic acids to cells and having even better properties with respect to cytotoxicity than the saponin GE1741.

This object is achieved by providing a saponin corresponding to formula (I):

(I)

In this context, $R^1$ is independent from other $R^1$ residues in the same molecule H or an acetyl residue, with the proviso that at least two $R^1$ residues are acetyl residues; and $R^2$ is independent from other $R^2$ residues in the same molecule H or an acetyl residue, with the proviso that at least two $R^2$ residues are acetyl residues.

The saponin has a common saponin core structure and does not comprise any unusual bonds. Rather, it differs from other saponins only in its sugar residues and/or its acetyl residues. For a better identification of the individual sugar residues in formula (I), they are marked with a corresponding abbreviation in the above depiction of formula (I). Thereby, the abbreviations have the following meaning:

| Abbreviation | Sugar residue |
|---|---|
| Fuc | Fucose |
| Gal | Galactose |
| Glc | Glucose |
| GlcA | Glucuronic acid |
| Qui | Quinovose |
| Rha | Rhamnose |
| Xyl | Xylose |

A compound according to formula (I) showed a transfection efficiency that was comparable to the transfection efficiency of GE1741. However, the cytotoxicity of the compound according to formula (I) was significantly lower than the cytotoxicity of GE1741. To be more precise, the compound according to formula (1) showed no significant cytotoxic effect even at concentrations as high as 24 μg/mL. At such a concentration, GE1741 already exhibited cytotoxic effects. This is a completely unexpected and surprising result since one would not expect such significantly lower cytotoxic properties of a saponin. Due to the high number of already existing saponins, the inventors could not expect that the compounds which are claimed here would show such a low cytotoxicity. It should be noted that saponins cannot be synthesized and can generally not simply be purchased from a supplier of chemicals. Rather, they need to be isolated from plants or parts of plants. This makes it particularly difficult to investigate the properties of saponins.

The inventors surprisingly found that saponins according to general formula (I) can be isolated from *Agrostemma githago* L. (the common corn-cockle) and show an unexpected low cytotoxicity at a comparable transfection efficiency as other saponins. It has not been described before that such saponins can be extracted from *Agrostemma githago* L.

In an embodiment, all sugars are present in their D stereoisomeric form.

In an embodiment, the saponin is present in a stereoisomeric form according to general formula (II):

(II)

In an embodiment, the saponin carries exactly four acetyl groups, i.e., two of the $R^1$ residues are acetyl residues, wherein the remaining $R^1$ residue is a hydrogen, and two of the $R^2$ residues are acetyl residues, wherein the remaining $R^2$ residue are a hydrogen in each case.

In an embodiment, in each case one acetyl residue is bonded to the oxygen atoms in C3 and C4 position of the corresponding quinovose residue and to the oxygen atoms in C4 and C6 position of the corresponding glucose residue, resulting in a saponin of formula (III). This saponin can also be denoted as AG1856. AG1856 possesses a Xyl-GlcA-Gal sugar chain, connected via GlcA with the C-3 atom of a quillaic acid/gypsogenin. AG1856 exhibits a structure motif known from prior art saponins like GE1741, namely a double acetylated quinovose residue connected to a fucose residue which is, in turn, directly connected (via an ester bridge) to the C-28-chain of the quillaic acid/gypsogenin. While in case of GE1741 a linear sugar chain is connected to the fucose residue, AG1856 bears a branched rhamnose residue carrying a xylose residue and an acetylated glucose residue.

(III)

In an embodiment, the saponin of the previous embodiment is present in a stereoisomeric form according to general formula (IV):

(IV)

In an embodiment, all three $R^1$ residues are acetyl residues, resulting in a saponin of formula (V):

(V)

In an embodiment, all four $R^2$ residues are acetyl residues, resulting in a saponin of formula (VI):

(VI)

In an embodiment, all $R^1$ and all $R^2$ residues are acetyl residues.

In an aspect, the solution also relates to the use of a saponin according to the preceding explanations in the in-vitro delivery of a nucleic acid, a lipid, a peptide and/or a protein to a cell. Thereby, the in-vitro delivery of nucleic acid is a particularly appropriate use of the saponin. Appropriate nucleic acids to be delivered are DNA, such as plasmid DNA or minicircle DNA, and RNA, such as small interfering RNA (siRNA). The nucleic acid or other molecule to be delivered can be present in the form of a nanoplex. Nanoplexes are typically formed by peptides or lipids being able to bind the small molecule to be delivered. Thus, a nucleic acid delivering nanoplex comprises a lipid or non-lipid carrier to which a nucleic acid is bound. Nanoplexes as can also be referred to as nanoparticles. In an embodiment, the nucleic acid to be delivered is a minicircle DNA. In an embodiment, the molecule to be delivered is a peptide minicircle DNA particle.

In an embodiment, the cell to which the nucleic acid, the lipid, the peptide and/or the protein is to be delivered is a eukaryotic cell. Human cells, animal cells (such as rodent cells) or plant cells are particularly appropriate to be used as cells. Yeast cells can also be used.

In an aspect, the solution relates to the use of a saponin according to the preceding explanations in therapy or diagnostics. Thereby, the saponin is used for an in-vivo delivery of a nucleic acid, a lipid, a peptide and/or a protein to a human or animal.

In an embodiment, the animal is a mammal, in particular a rodent.

The inventors found out that a saponin according to general formulae (I) to (VI) does not only increase the transfection efficiency when used alone, but is particularly appropriate to enhance the transfection efficiency of classic transfection reagents. Thus, it can be used as booster for such transfection reagents. The above-described uses encompass the use of such a saponin as booster for classic transfection reagents. In an embodiment, the saponin is used in vivo or in vitro in combination with at least one transfection reagent chosen from the group consisting of liposomal-based transfection reagents and polymer-based transfection reagent. Examples of such transfection reagents are listed below.

In an aspect, the solution relates to method for delivering a nucleic acid, a lipid, a peptide and/or a protein to a human or animal in need thereof by using a saponin according to the preceding explanations.

In an aspect, the solution relates to a transfection composition comprising a saponin according to the preceding explanations. Thereby, the saponin can particularly well be used as transfection enhancing agent.

In an aspect, the solution relates to a transfection composition comprising a classic transfection reagent and at least one saponin according to any of formulae (I) to (VI), wherein the residues $R^1$ and $R^2$ have the meanings described above. Classic transfection reagents can be divided into two subgroups, namely liposomal-based transfection reagents and polymer-based transfection reagents. Liposomal-based transfection reagents consist of mostly cationic charged lipids with hydrophobic fatty acid chains bound to polar head groups such as trimethylammonium propane. Polymer-based transfection reagents consist of organic polymers containing a charged head group such as polyethylenimine (PEI).

Examples for commercially available classic liposomal-based transfection reagents are METAFECTENE; TransFast; Stemfect; and TransFectin.

Examples for commercially available classic polymer-based transfection reagents are GeneCellin; X-tremeGene transfection reagents such as X-tremeGene 9 DNA Transfection Reagent, X-tremeGene HP DNA Transfection Reagent, and X-tremeGene siRNA Transfection Reagent; TransIT transfection reagents such as TransIT-X2 Dynamic Delivery System, TransIT-LT1 Reagent, TransIT-2020 Reagent, TransIT-PRO Reagent, TransIT-VirusGEN Reagent, TransIT-*Lenti* Reagent, TransIT-Insect Reagent, TransIT-293 Reagent, TransIT-BrCa Reagent, TransIT-CHO Transfection Reagent, TransIT-HeLaMONSTER Transfection Reagent, TransIT-Jurkat Reagent, TransIT-Keratinocyte Reagent, TransIT-mRNA Transfection Reagent, TransIT-TKO Reagent, TransIT-siQUEST Reagent, and TransIT-Oligo Reagent; Viafect; FuGENE; Xfect; TurboFect; and GenJet.

In an embodiment, the transfection reagent is a liposomal-based transfection reagent.

In an embodiment, the transfection reagent is a polymer-based transfection reagent.

In an embodiment, the transfection reagent is chosen from the group consisting of a TransIT transfection reagents, X-tremeGene transfection reagents, and GeneCellin.

In an embodiment, the transfection reagent is GeneCellin.

In an aspect, the solution relates to a method for an in-vitro transfection of a cell. This method comprises the step of incubating a cell with a nucleic acid in the presence of a saponin according to the preceding explanations. The transfection can be a transient transfection or a stable transfection. DNA and RNA are appropriate nucleic acids, wherein DNA is particularly appropriate. In an embodiment, the nucleic acid to be delivered is a minicircle DNA.

In an embodiment, the cell is a eukaryotic cell. Human cells, animal cells (such as rodent cells) or plant cells are particularly appropriate to be used as cells. Yeast cells can also be used.

In an embodiment, the nucleic acid forms part of a nanoparticle. To give an example, a DNA nanoparticle may be used. Peptide minicircle DNA particles or particles comprising a peptide bound to DNA are further appropriate examples. Likewise, RNA nanoparticles are appropriate entities to carry out the transfection.

In an embodiment, the saponin is used in a concentration lying in a range between 1 µg/mL and 50 µg/mL, in particular between 1.5 µg/mL and 45 µg/mL, in particular between 2 µg/mL and 40 µg/mL, in particular between 2.5 µg/mL and 35 µg/mL, in particular between 3 µg/mL and 30 µg/mL, in particular between 4 µg/mL and 25 µg/mL, in particular between 4.5 µg/mL and 24 µg/mL, in particular between 5 µg/mL and 23 µg/mL, in particular between 5.5 µg/mL and 20 µg/mL, in particular between 6 µg/mL and 15 µg/mL, in particular between 7 µg/mL and 10 µg/mL, in particular between 8 µg/mL and 9 µg/mL.

In an embodiment, the saponin is used in combination with at least one transfection reagent chosen from the group consisting of liposomal-based transfection reagents and polymer-based transfection reagents. Appropriate examples of transfection reagents are listed above.

In an aspect, the present solution relates to method for isolating a saponin according to the preceding explanations from *Agrostemma githago* L. This method comprises the steps explained in the following. Thereby, the steps need not necessarily be performed in the indicated order. Rather, any other sensible order of method steps can also be applied.

In a first step, seed of *Agrostemma githago* L. are ground. Then, the ground seed are then defatted with an organic solvent, e.g. with petroleum ether. Subsequently, the ground defatted seeds are freeze-dried. In doing so, a seed powder is obtained.

The seed powder is extracted with an alcoholic solvent to obtain a root extract. Methanol or any other short-chain organic alcohol (like ethanol or isopropanol) is a suited alcoholic solvent. To give an example, a solvent concentration of 70 to 100% (v/v), in particular of 75 to 95%, in particular of 80 to 90% is an appropriate high concentration. 90% methanol is a particular appropriate alcoholic solvent. If the alcoholic solvent is miscible with water, water can be used as co-solvent.

Afterwards, the alcoholic solvent is removed from the seed extract to obtain a dry extract. This removal can be performed, e.g., by vacuum distillation.

The dry extract is then dissolved in a low-concentrated organic solvent to obtain an extract solution. The term "low-concentrated organic solvent" relates to an organic solvent having a concentration of less than 50% (v/v). To give an example, a concentration of 10% to 50%, in particular of 15% to 45%, in particular of 20% to 40%, in particular of 25% to 30% is an appropriate concentration range for the low-concentrated organic solvent. Once again, methanol or any other short-chain organic alcohol is a suited organic solvent. Likewise, water can be used as co-solvent, if the low-concentrated organic solvent is miscible with water.

The extract solution is then subjected to at least one chromatographic separation step. Thereby, a purified saponin solution is obtained. The chromatographic separation can be implemented by high-performance liquid chromatography (HPLC). Typically, it is advisable to perform more than one chromatographic separation step in order to enhance the purity of the purified saponin solution. Thus, it is possible to subject the purified saponin solution obtained after the first chromatographic separation step to at least one subsequent chromatographic separation step. Thereby, different columns can be used in the individual chromatographic separation steps.

It is possible to perform the individual chromatographic separation steps (if more than one chromatographic separation step is carried out) in different stationary and/or mobile phases. Thus, it is possible to change the solvents used in the individual chromatographic separation steps between these steps.

Finally, the solvent is removed from the purified saponin solution after the at least one chromatographic separation step. This can, e.g., be done by vacuum distillation or by freeze-drying. A purified saponin powder results.

All embodiments disclosed herein can be combined in any desired way. Furthermore, embodiments explained with respect to the claimed saponins can be transferred to the claimed uses and methods, and vice versa. Likewise, embodiments of the explained uses and methods can be transferred to the described other methods and uses in any desired way. The described transfection composition can also make use of any of the described embodiments.

BRIEF DESCRIPTION OF THE DRAWINGS

Further details of aspects of the solution will be explained with respect to an exemplary embodiment and accompanying Figures.

DETAILED DESCRIPTION

Exemplary Embodiment: Isolation of the Saponin AG1856 from *Agrostemma githago* L Seeds of *Agrostemma githago* L. have been used for extraction (Agrostemmae semen, AGRO 26/80, from the Federal Center for Plant Breeding Research on Cultivated Plants (BAZ) in Gatersleben). Following grinding, 190 g of seeds were defatted overnight by Soxhlet extraction using petroleum ether. The defatted seed powder (177.1 g) was extracted three times using each 1 L 90% methanol. The methanol was evaporated by vacuum distillation and the water phase was freeze-dried (Christ alpha 2-4, Osterode, Germany). The yield of dry extract was 11.5 g (6%).

Size Exclusion Chromatography

The dry extract (200 mg) was dissolved in 1 mL DMSO and 1 mL of 50% methanol. This solution was subjected to size exclusion chromatography by medium pressure chromatography (MPLC, Azura-system, Knauer, Germany) equipped with a Sephadex™ LH-20 column (10×2000 mm). Elution was performed using methanol/water (1:1). The flow rate was 1 mL/min; detection was performed at 210 nm. Fractions were collected and dried by vacuum centrifugation and freeze-drying.

High Performance Liquid Chromatography (HPLC)

Selected fractions from the MPLC were subjected to HPLC (LC-8A Shimadzu) using a C18 column (Kinetex® 5 μm C18 100 A, LC Column 250×10.0 mm). The solvent system was (A) acetonitrile and (B) water (0.01% trifluoroacetic acid). A mobile phase gradient (45 min) was applied: 80 to 70% (B) over 10 min, then to 70 to 60% (B) between 10 and 15 min, 60 to 50% (B) between 15 and 20 min, 50 to 30% (B) between 20 and 25 min, 30 to 10% (B) between 25 and 30 min, 10 to 80% (B) between 30 to 40 min and maintained at 80% (B) for an additional 5 min. The flow rate was set at 2 mL/min, the analysis was recorded at 210 nm and 254 nm.

The structure of this saponin corresponds to formula (IV). While AG1856 comprises four acetyl residues (one in C3 position and one in C4 position of the quinovose residue as well as one in C4 position and one bound at the methyl residue in C6 position), preliminary data suggests that the amount and position of the acetyl residues can be varied within the indicated limits without significantly changing the properties of the respective saponin.

Testing the Properties of AG1856 in Comparison to Other Saponins

Murine neuroblastoma cells (Neuro2a cells, ATTC CCL-131™) were cultured in Dulbecco's Modified Eagle's Medium (DMEM), containing 1 g/L D-Glucose, 10% FBS and stable glutamine, at 37° C. and 5% $CO_2$. These cells were then incubated with different saponins to test the cytotoxic effect of the saponins.

The tested saponins were GE1741, 501861 and AG1856. All 3 saponins share a common structural motive but bear slightly different sugar residues. This is elucidated in the following general formula (VII) with the subsequent Table 1.

(VII)

TABLE 1

Sugar residues of saponins GE1741, SO1861 and AG1856.

| Saponin | $R_1$ | $R_2$ | $R_3$ | $R_4$ |
|---|---|---|---|---|
| GE1741 | OH | -QuiAcAc | Xyl | H |
| SO1861 | OH | -QuiAc-(1→3)-Xyl | Glc | H |
| AG1856 | OH | -QuiAcAc | H | GlcAcAc |

The cell confluency as a measure of cell viability was determined optically via cell number calculating algorithms (Cytosmart). The results are depicted in FIGS. 1A to 1D.

Figure 1A:
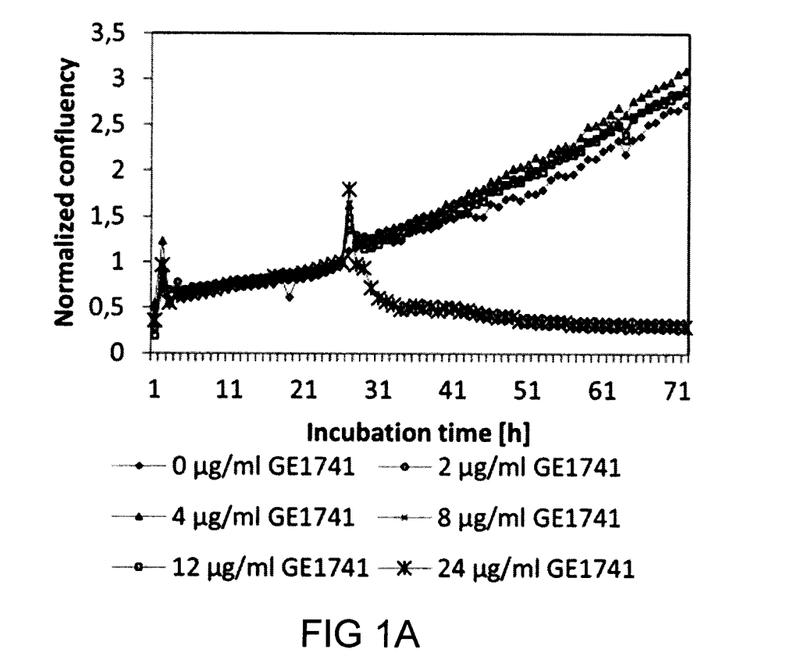
FIG. 1A shows the results of cell viability tests with the saponin GE1741 at different saponin concentrations.

FIG. 1A shows the results of an experiment in which different GE1741 concentrations were applied to Neuro2a cells 24 h after seeding. A distinct toxic effect was observed at a GE1741 concentration of 24 µg/mL. The initial peak was due to apoptotic cell expansion.

Figure 1B:
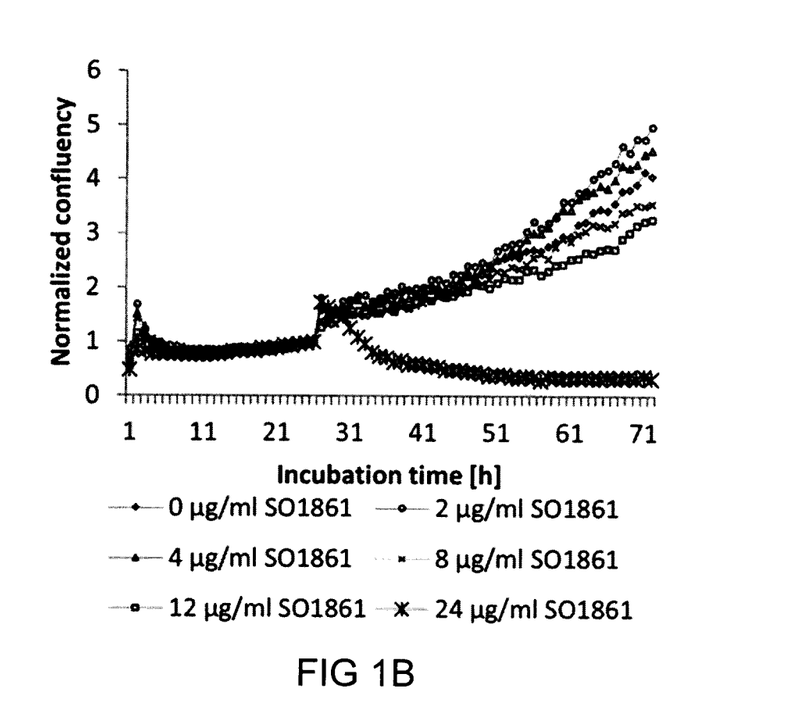
FIG. 1B shows the results of cell viability tests with the saponin SO1861 at different saponin concentrations.

FIG. 1B shows the results of an experiment in which different SO1861 concentrations were applied to Neuro2a cells 24 h after seeding. A distinct toxic effect was observed at a 501861 concentration of 24 µg/mL. The initial peak was due to apoptotic cell expansion.

Figure 1C:
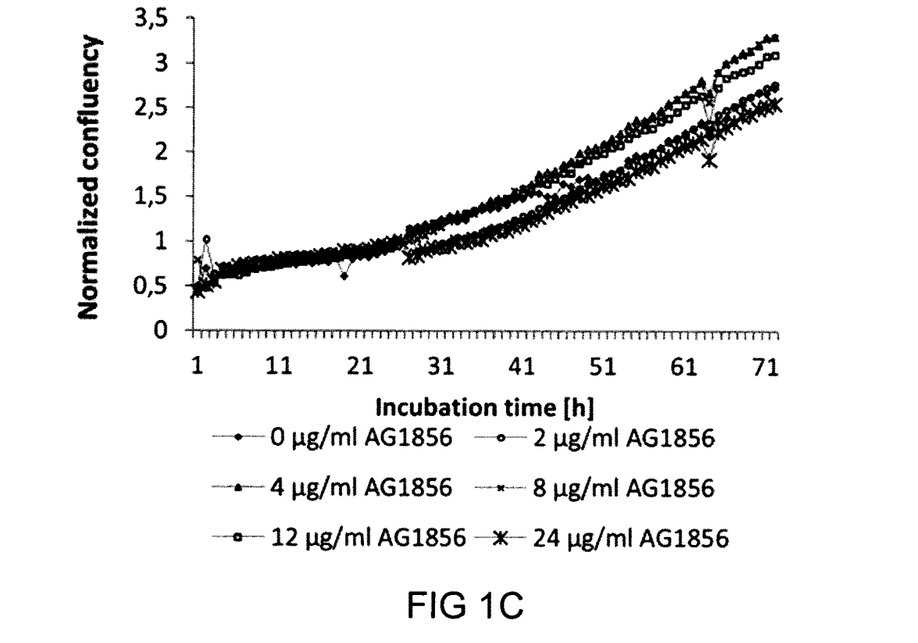
FIG. 1C shows the results of cell viability tests with the saponin AG1856 at different saponin concentrations.

FIG. 1C shows the results of an experiment in which different AG1856 concentrations were applied to Neuro2a cells 24 h after seeding. No distinct toxic effect was observed at an AG1856 concentration of 24 µg/mL.

Figure 1D:
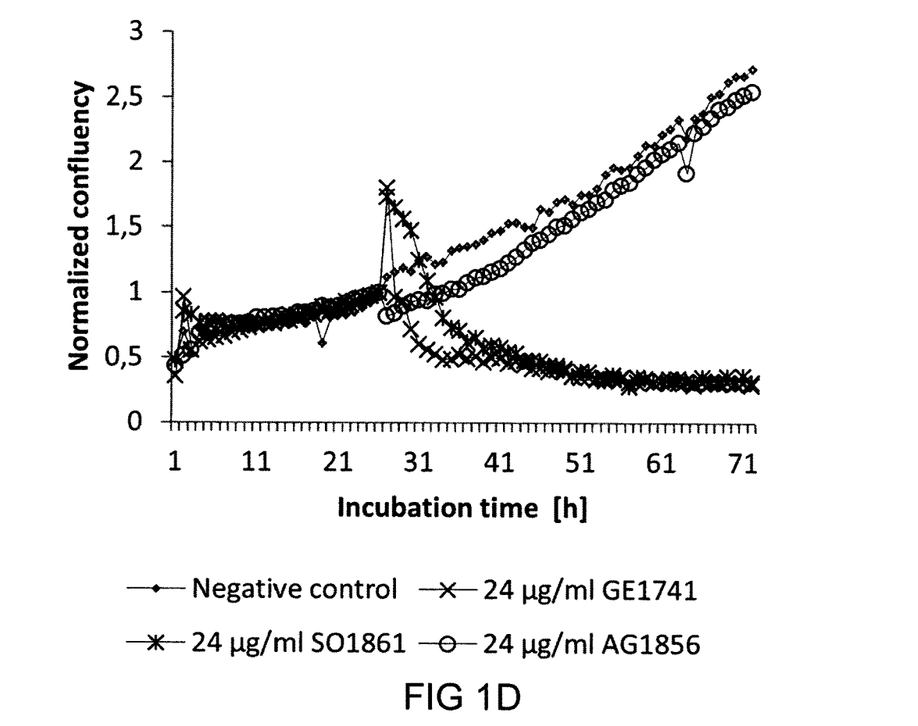
FIG. 1D shows the results of cell viability tests with different saponins at a saponin concentration of 24 µg/mL.

FIG. 1D shows a comparison of the different saponins GE1741, 501861 and AG1856 applied to Neuro2a cells at a concentration of 24 µg/mL. Only AG1856 showed no toxic effect at a concentration of 24 µg/mL.

Buffer was used in each case as negative control.

Cell Impedance Measurements

Figure 2:
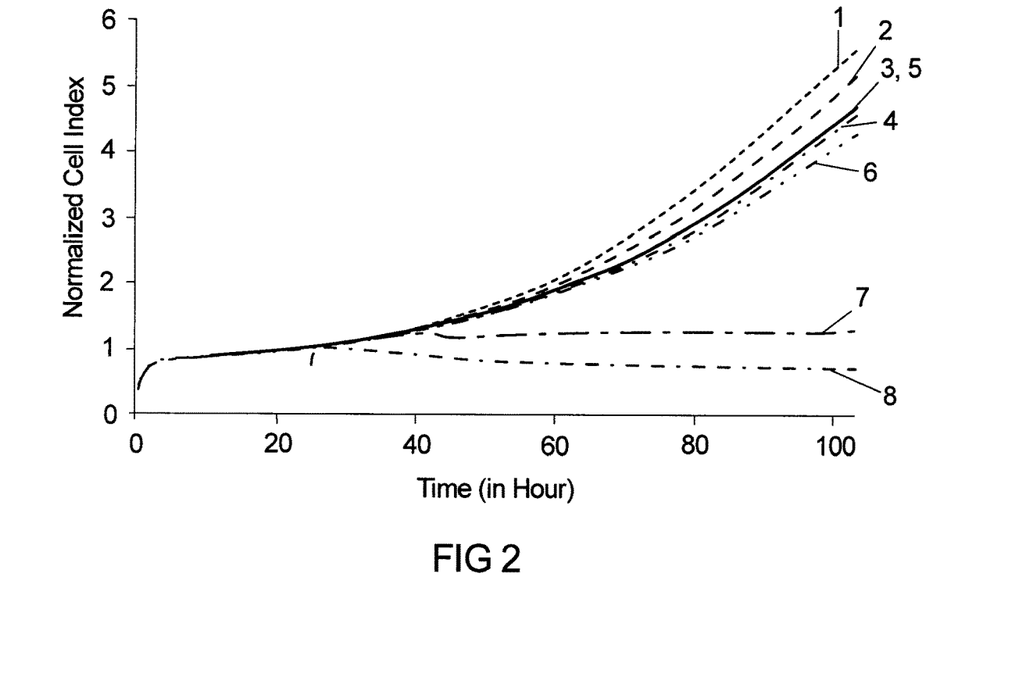
FIG. 2 shows the results of cell viability tests via impedance measurement with the saponin AG1856 at different saponin concentrations.

FIG. 2 shows the results of a cell viability test via impedance measurement with different AG1856 concentrations. The impedance (alternating current resistance) at the well bottom as real-time cell viability measure of adherent cells was determined by the iCELLigence® device. 8000 Neuro2a cells per well were seeded into two 8-well E-plates L8 and incubated for 24 h in a volume of 800 µL. For transfection toxicity studies 50 µL of reagent was added after the respective volume of culture medium was removed. Each 10 minutes the impedance/viability was measured. The results were analyzed and displayed with the RTCA Data Analysis Software.

The curves indicated in FIG. 2 represent the results of the following measurements:

| Number of curve | Tested compound |
|---|---|
| 1 | Negative control (buffer) |
| 2 | 2 µg/mL AG1856 |
| 3 | 4 µg/mL AG1856 |
| 4 | 8 µg/mL AG1856 |
| 5 | 12 µg/mL AG1856 |
| 6 | 24 µg/mL AG1856 |
| 7 | 24 µg/mL GE1741 |
| 8 | Positive control (4 µg/mL Puromycin) |

The stepwise increase of AG1856 concentration led to no significant toxicity increase. In comparison, the severe toxicity of GE1741 (at a concentration of 24 µg/mL) prevented cell growth, similar to the toxic positive control puromycin (at a concentration of 4 µg/mL).

Figure 3:
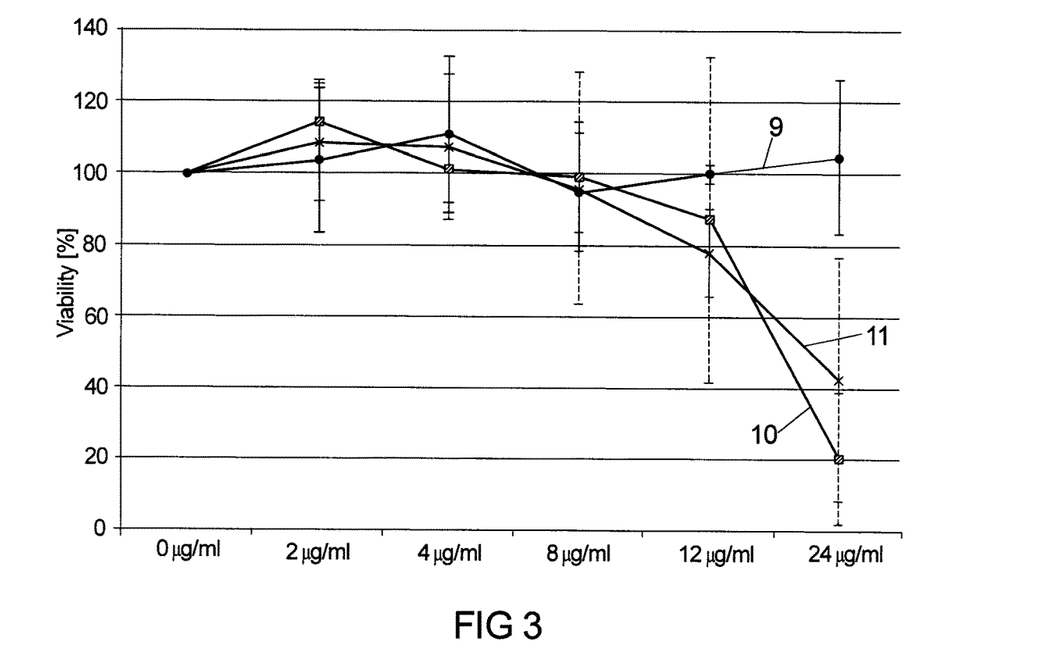
FIG. 3 shows the results of cell viability tests with different saponins at different saponin concentrations.

FIG. 3 shows the results of a cell viability test performed by an MTT (3-(4,5-dimethylthiazol-2-yl)-2,5-diphenyltetrazolium bromide) assay with different AG1856 concentrations.

The determination of mitochondrial activity due to the formation of formazan out of MTT served as biochemical method to measure cell viability. A toxicity-mediated drop of viability could not be observed for AG1856 (curve 9), but was observed for GE1741 (curve 10) and 501861 (curve 11) in the same concentration.

Figure 4:
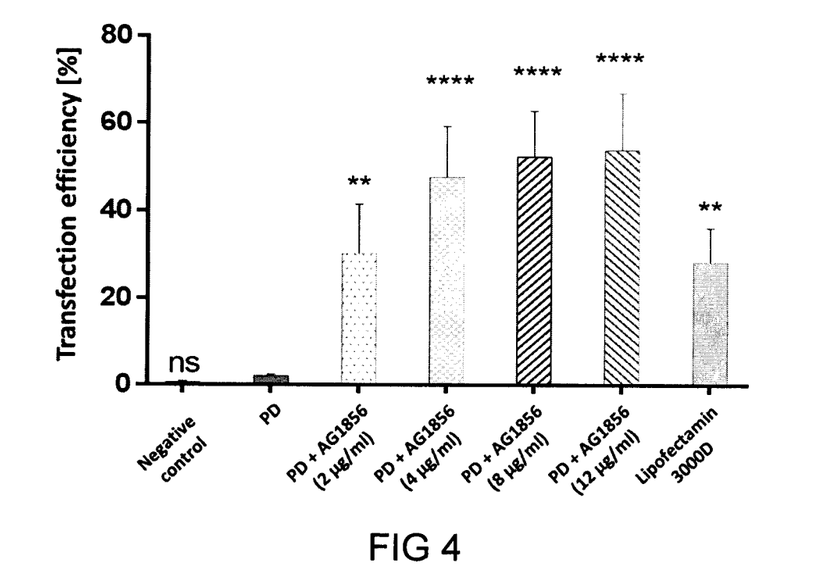
FIG. 4 shows the transfection efficiency of AG1856 for the transfection of nanoplexes comprising DNA bound to a peptide.

FIG. 4 shows the ability of AG1856 in delivery of nanoparticles comprising DNA bound to a peptide (PD nanoplexes). The PD nanoplexes comprised DNA encoding for the green fluorescent protein (GFP). Therewith, the transfection efficiency could very easily be monitored by detecting the fluorescence of the cells that have been incubated with the corresponding DNA nanoparticles. The corresponding incubation period was chosen to be 48 hours in the present case.

Formulation of PD Nanoplexes 20 mg of positively charged poly-lysine peptides without an integrin-receptor-targeting amino sequence were purchased from Genecust. The vector of p-EGFP-N3, coding for the green fluorescing protein (GFP), was obtained and propagated with DH5α— E. coli cells (1.645 mg/mL). StemMACS™ eGFP mRNA (20 µg) and GFP encoding minicircle DNA (Gene Bank Accession: U55761) were used as further nucleic acids. In order to conduct the transfection, nanoplexes were formulated as follows: The poly-lysine peptides (P) and the p-EGFP-N3 vector (D), were diluted in water (each 50 µL) and mixed thoroughly by fast pipetting in a ratio of 4:1. The nanoplexes were allowed to form in a 30-minute incubation step. Thereafter, the nanoplex suspension was diluted with OptiMEM to a total volume of 1 mL. The commercial transfection reagent Lipofectamin®3000 was formulated as described by the manufacturer.

Sapofection (Transfection with Triterpene Saponins)

Neuro2a cells (15,000 cells/well) were seeded in a 24-well-plate with a well volume of 400 µL culture medium and incubated for 24 h. The transfection reagents were formulated as described above and admixed with saponin solution, if required. The culture medium was replaced with the transfection medium with a final amount of 500 ng DNA/RNA. After a 48 h incubation period, the transfection medium was removed, the cells were trypsinized and transferred in a polystyrene tube for flow cytometry (Cytoflex). For each measurement 10,000 cells were acquired. The transfection efficiency was determined by the analysis software Cyflogic (by comparison of the sample plots with the negative control in terms of fluorescence).

AG1856 showed already at a concentration of 2 µg/mL a very good transfection efficiency that was comparable to that of the gold standard Lipofectamin. At concentrations of 4 µg/mL or higher, the transfection efficiency of AG1856 was even higher than that of Lipofectamin. Data in FIG. 4 is expressed as mean±standard deviation (SD). Lipofectamin3000 was the positive control (N=4; p value<0.01 (), p value<0.0001 (**), ns: non-significant compared to PD with one-way ANOVA).

Figure 5:
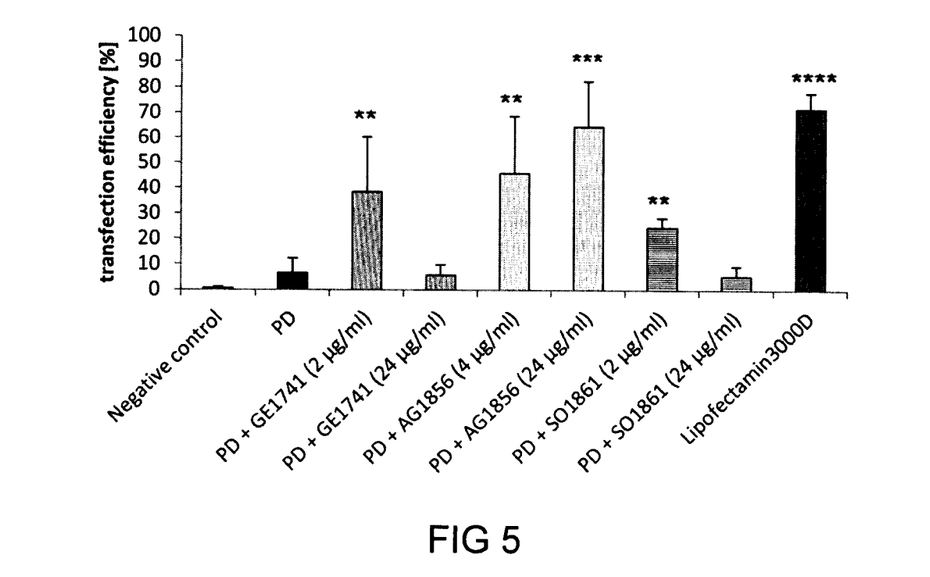
FIG. 5 shows the transfection efficiency of different saponins for the transfection of nanoplexes comprising DNA bound to a peptide.

FIG. 5 shows the transfection efficiency of high concentrated saponin-mediated transfections. Neuro2a cells were transfected with GFP-plasmid bearing nanoplexes as explained above with and without saponin co-application. The saponins GE1741, 501861 and AG1856 were used in their working concentrations or in a concentration of 24 µg/mL. The working concentration of GE1741 and 501861 presents the highest non-toxic concentration. For AG1856, it represents the lowest effective concentration, wherein an increase shows no significant transfection efficiency increase (cf. FIG. 4). While an increased concentration of 24 µg/mL led to a severe efficiency drop of GE1741- and SO1861-mediated transfections due to their toxicity, an even increased efficiency could be observed in case of AG1856-mediated transfections. Lipofectamin3000 served as positive control. (N=3; p value<0.01 (), p value<0.0001 (**), ns: non-significant compared to PD with one-way ANOVA).

Figure 6A:
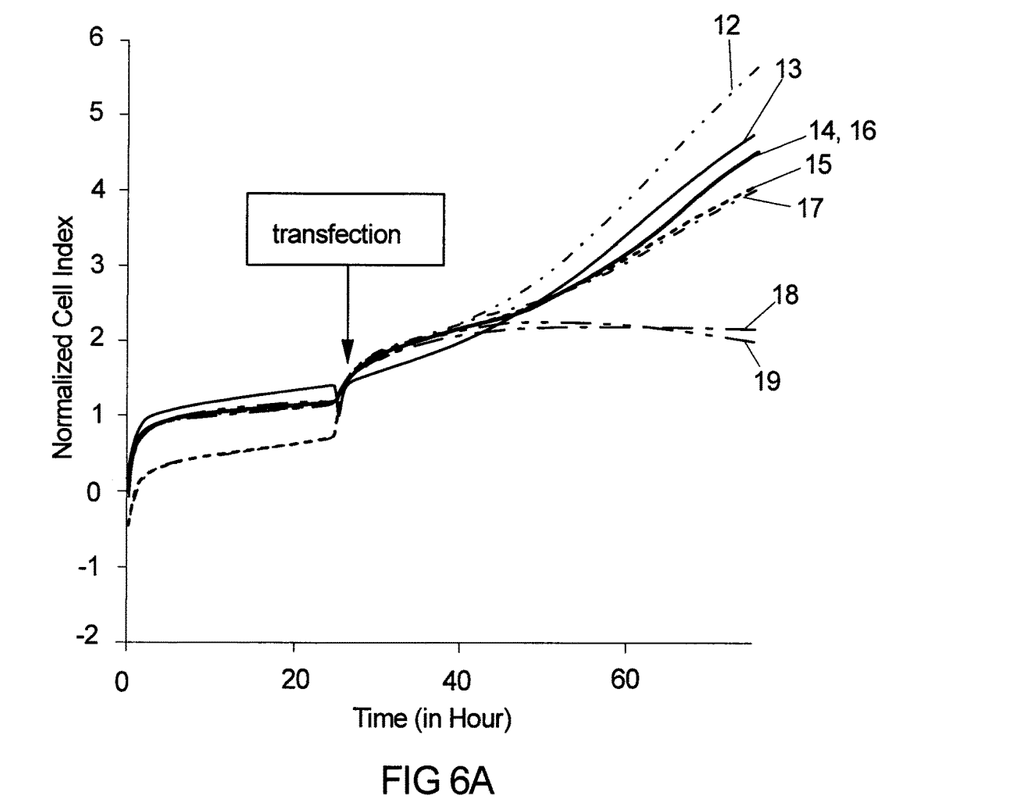
FIG. 6A shows a first plot of the results of cell viability tests upon AG1856-mediated delivery of nanoplexes.
Figure 6B:
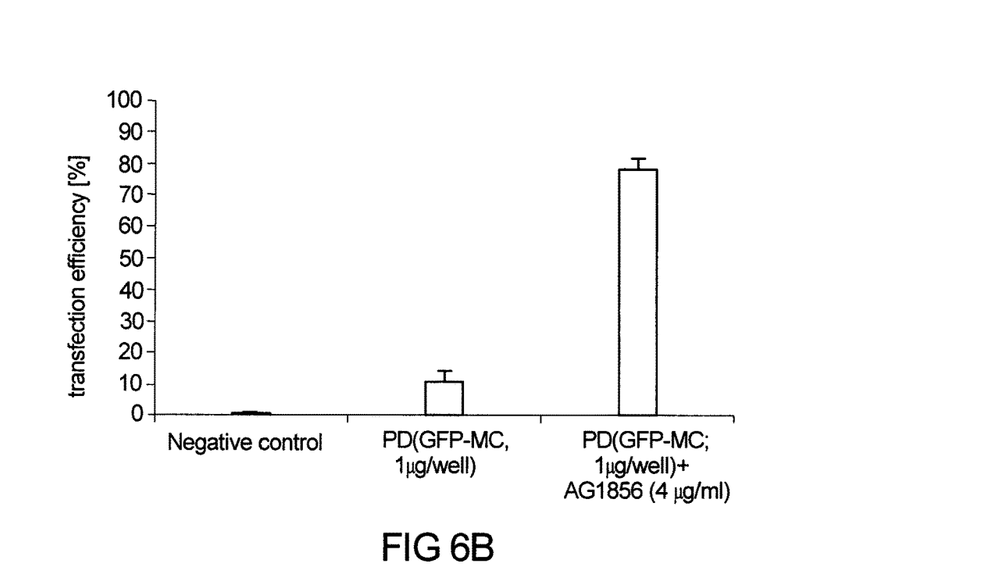
FIG. 6B shows a second plot of the results of cell viability tests upon AG1856-mediated delivery of nanoplexes.

FIGS. 6A and 6B show cell viability tests upon AG1856-mediated delivery of GFP-minicircle-DNA- or RIP-minicircle-DNA-bearing nanoplexes. The purpose of the conducted experiment was to reveal the capability of performing non-toxic and highly efficient gene delivery as well as to exhibit the feasibility not just to deliver reporter genes, but therapeutic genes for tumor therapies.

FIG. 6A shows the viability upon transfection of GFP minicircle DNA, saporin minicircle DNA and dianthin minicircle DNA. Saporin and dianthin are cytotoxic proteins. If the transfection is successful, the transfected cells will die.

The curves depicted in FIG. 6A represent the results of the following measurements:

| Number of curve | Tested compound |
| --- | --- |
| 12 | Negative control (buffer) |
| 13 | 4 µg/mL AG1856 |
| 14 | PD(dianthin minicircle, 1 µg) |
| 15 | PD(saporin minicircle, 1 µg) |
| 16 | PD(GFP minicircle, 1 µg) |
| 17 | PD(GFP minicircle, 1 µg) + 4 µg/mL AG1856 |
| 18 | PD(saporin minicircle, 1 µg) + 4 µg/mL AG1856 |
| 19 | PD(dianthin minicircle, 1 µg) + 4 µg/mL AG1856 |

No distinct toxicity of GFP minicircle DNA without and with AG1856 co-application could be observed. The transfection of nanoplexes with the ribosome inactivating proteins dianthin and saporin (dianthin minicircle DNA or saporin minicircle DNA) showed only severe toxicity when AG1856 was co-administered. AG1856 alone showed no toxicity.

FIG. 6B indicates that the transfection with minicircle DNA (being smaller, less degradable and more efficient than a DNA plasmid) coding for GFP-DNA results in a highly efficient gene delivery, when performed with AG1856. Four cells out of five were fluorescing as determined by flow cytometric analysis (n>3).

Further experiments confirmed the low toxicity of AG1856 in vivo and in vitro. These experiments will be explained in the following.

Chronic Toxicity Study of AG1856 In Vivo in Combination with Targeted Anti-Tumor Nanoplasmids
Objectives This study was performed to evaluate the tolerability of combined treatment of nanoplasmids (NP) and AG1856 in Naval Medical Research Institute (NMRI) nu/nu mice.

Description

Figure 7:
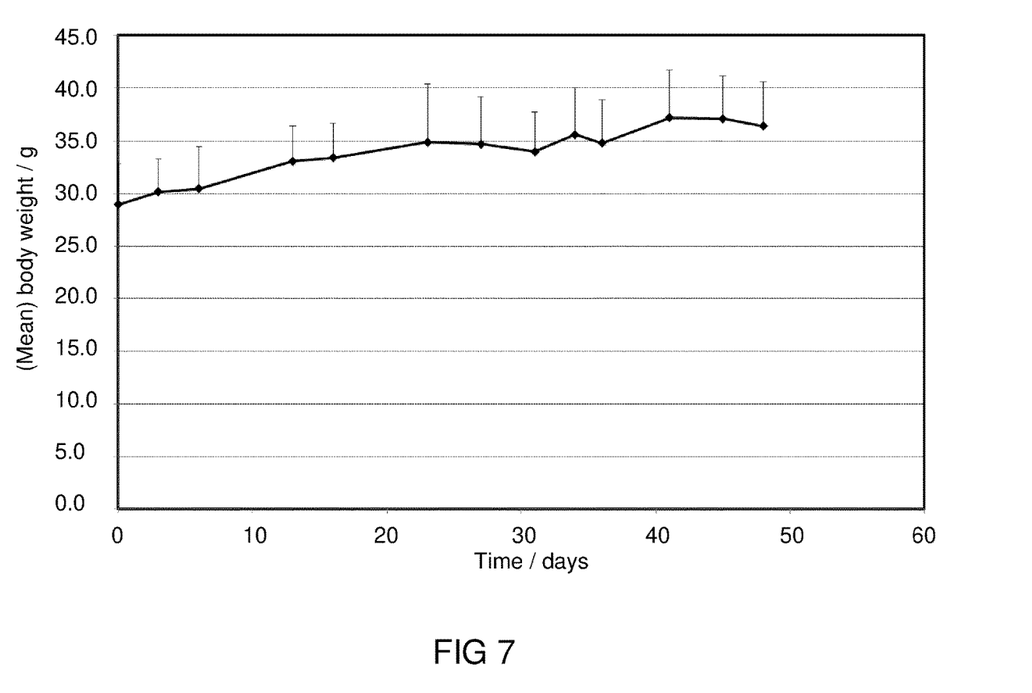
FIG. 7 shows the results of an in vivo toxicity study.

For the study, female NMRI nu/nu mice were used. Animals were treated with NP+AG1856 at doses of 50 and 90 µg/mouse respectively and after animal recovery in a second round at same doses.
Summary of Results and Discussion The study revealed no side effects for the mice treated with the combination of NP+AG1856. Therefore, all repeated treatments were well tolerated. No changes in body weight were seen, cf. the results depicted in FIG. 7.

Conclusions

In conclusion, this treatment is well applicable for future therapeutic experiments at a given dose and application schedule. The application of 90 µg per mouse shows the superior tolerance of AG1856 even in high doses compared to other saponins.

Toxicity Studies of AG1856 In Vitro in Combination with Different Targeted Anti-Tumor Nanoplasmids
Material and Methods To evaluate an enhancement of the transfection efficiency through AG1856 an optical based cytotoxicity assay after transfection with ribosome inactivating proteins (RIPs) was chosen.

Plasmids

As transgenes, 6-His-Agrostin RNA3 (Weise et al. 2020) and 6-His-Saporin 3 (Fabbrini et al. 1997) were cloned via BamHI and XbaI (Agrostin) and via SalI and NheI cleavage into pMC.CMV-MCS-SV40polyA (BioCat GmbH, Heidelberg, Germany) to produce minicircle with ZYCY10P3S2T (Kay et al. 2010). In addition to this, Saporin 3 and Gypsophillin S (Kokorin et al. 2019) were cloned into NTC9385R-BGHpA-Nanoplasmids and synthesized by Nature Technology Corporation (Lincoln, NB, USA) as previously described (Luke et al. 2011).

Nanoplex Formulation

For 3 wells (96-Well-Plate), 300 ng plasmid DNA were diluted in 25 µL water and mixed with 25 µL of a solution with 2,100 ng Peptide Y ($K_{16}$GACYGLPHKFCG) (GeneCust, Dudelage, Luxembourg). After an incubation period of 30 min, the nanoplexes were formed automatically.

Cell Culture

Murine neuroblastoma cells Neuro2A (ATCC® CCL-131) were cultivated in BioWhittaker® Dulbecco's Modified Eagle's Medium (DMEM) (Lonza Group, Basel, Switzerland) supplemented with 10% FBS and 1% non-essential amino acids (Lonza Group, Basel, Switzerland) in a 5% $CO_2$ atmosphere and 37° C.

Transfection 4,000 cells per well were seeded in clear 96-well-plates and cultivated for 24 h. After this, the medium was exchanged against a mixture of freshly formulated nanoplexes (described above), culture medium (described above) and AG1856 (5 µg/mL) or water for the control group. This leads to 200 µL medium per well with 500 ng/mL DNA. As negative control, water was used and as positive control 5 µg/mL puromycin (Carl Roth, Karlsruhe, Germany). After the transfection, the cells were observed for 48 h.

Live Cell Imaging

The cytotoxic effect of the different constructs on the cells was measured by a CytoSMART® Omni, a camera-based system which took a photo of the bottom of each well every hour. The CytoSMART® Omni software calculated the confluence which is formed by living cells which are attached to the bottom. So, the cell growth could be monitored for 72 h.

Results and Discussion

The confluence values are normalized to the certain point of intervention to have a better comparability between the groups (Normalized Cell Index, NCI). After the intervention, all wells treated with nanoplexes but not with AG1856 showed no sign for inhibition of proliferation. They behaved like the negative control group and partially showed even a better growth. Although the cells which were treated with just AG1856 proliferated 12% worse than the negative group, the cytotoxic effect of the groups which were intervened with nanoplexes and AG1856 was much bigger. The cells showed no more proliferation after 36 h. This indicates that the transfection was successful because after this period the RIPs were formed and inhibited the protein biosynthesis, which led to a cytostatic effect. The positive control behaved nearly equally but had no lag period before a cytostatic effect could be observed. The reason for that is that puromycin did not have to be formed and could inhibit the growth of the cells instantly.

Figure 8:
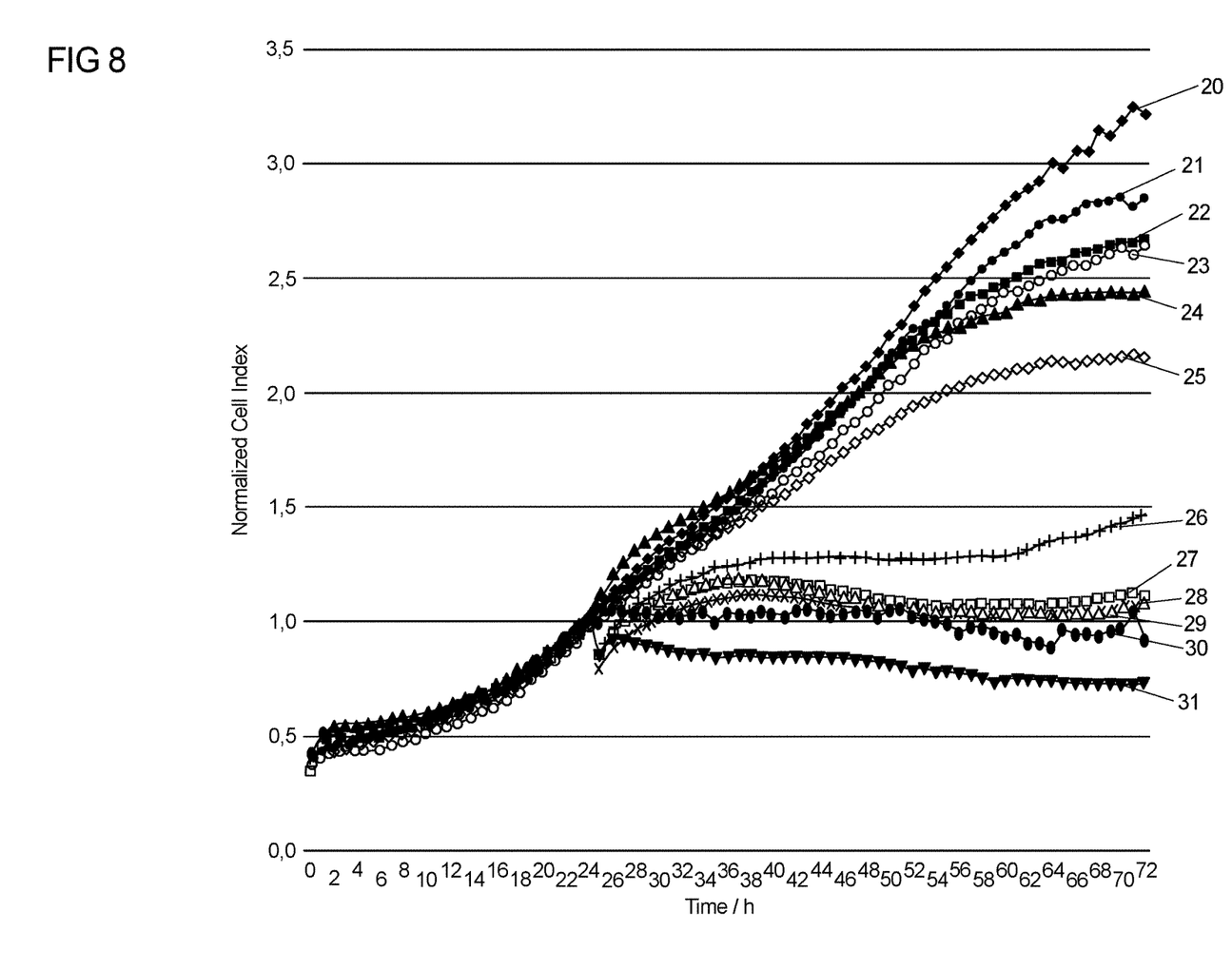
FIG. 8 shows the results of an in vitro toxicity study.

FIG. 8 shows the detailed results, namely the confluence normalized on the point of intervention (t=24 h). The curves represent the confluency after treatment with the following constructs:

| Number of curve | Construct used for treatment |
|---|---|
| 20 | Minicircle Saporin 3 |
| 21 | Nanoplex Saporin 3 |
| 22 | Minicircle Agrostin RNA3 |
| 23 | Nanoplex Gypsophilin S |
| 24 | negative control |
| 25 | AG1856 only |
| 26 | Minicircle Saporin 3 + AG1856 |
| 27 | Minicircle Agrostin RNA3 + AG1856 |
| 28 | Nanoplex Saporin 3 + AG1856 |
| 29 | Nanoplex Gypsophilin S + AG1856 |
| 30 | positive control |
| 31 | positive control + AG1856 |

All groups treated with RIP-nanoplexes and AG1856 showed strong retention in cell growth while the intervention on the groups which were treated just with nanoplexes and no AG1856 had no impact on the cell growth.

Conclusion

AG1856 was crucial for the cytotoxic effect of the RIP-coding nanoplexes. Without this transfection enhancer no cytotoxic effect could be observed.

LITERATURE CITED WITH RESPECT TO THE TOXICITY STUDIES

M. S. Fabbrini, E. Rappocciolo, D. Carpani, et al., Characterization of a saporin isoform with lower ribosome-inhibiting activity, *The Biochemical journal,* 322 (Pt 3) (1997) 719-727.

M. A. Kay, C. Y. He and Z. Y. Chen, A robust system for production of minicircle DNA vectors, *Nature Biotechnology,* 28 (2010) 1287-1289.

A. Kokorin, C. Weise, S. Sama, et al., A new type 1 ribosome-inactivating protein from the seeds of Gypsophila elegans M.Bieb, *Phytochemistry,* 157 (2019) 121-127.

J. M. Luke, J. M. Vincent, S. X. Du, et al., Improved antibiotic-free plasmid vector design by incorporation of transient expression enhancers, *Gene Therapy,* 18 (2011) 334-343.

C. Weise, A. Schrot, L. T. D. Wuerger, et al., An unusual type I ribosome-inactivating protein from Agrostemma githago L, *Scientific Reports,* 10 (2020) 15377.

The invention claimed is:

1. A saponin according to formula (I):

(I)

wherein:

$R^1$ is independent from other $R^1$ residues in the same molecule H or an acetyl residue, with the proviso that at least two $R^1$ residues are acetyl residues; and $R^2$ is independent from other $R^2$ residues in the same molecule H or an acetyl residue, with the proviso that at least two $R^2$ residues are acetyl residues.

2. The saponin according to claim 1, wherein it carries exactly four acetyl residues.

3. The saponin according to claim 2, wherein in each case one acetyl residue is bonded to the oxygen atoms in C3 and C4 position of the corresponding quinovose residue and to the oxygen atoms in C4 and C6 position of the corresponding glucose residue.

4. A medical method for delivering a nucleic acid, a lipid, a peptide and/or a protein to a human or animal by using a saponin according to claim 1 as transfection enhancing agent.

5. The medical method according to claim 4, wherein the saponin is applied in combination with at least one transfection reagent chosen from the group consisting of liposomal-based transfection reagents and polymer-based transfection reagents.

6. A transfection composition, comprising a saponin according to claim 1.

7. The transfection composition according to claim 6, further comprising at least one transfection reagent chosen from the group consisting of liposomal-based transfection reagents and polymer-based transfection reagents.

8. A method for an in-vitro transfection, comprising the step of incubating a cell with a nucleic acid in the presence of a saponin according to claim 1.

9. The method according to claim 8, wherein the cell is a eukaryotic cell.

10. The method according to claim 8, wherein the nucleic acid forms part of a nanoparticle.

11. The method according to claim 8, wherein the saponin is used in a concentration lying in a range of 1 µg/mL to 50 µg/mL.

12. The method according to claim 8, wherein the saponin is used in combination with at least one transfection reagent chosen from the group consisting of liposomal-based transfection reagents and polymer-based transfection reagents.

\* \* \* \* \*